US009406940B2

(12) United States Patent
Takeuchi et al.

(10) Patent No.: US 9,406,940 B2
(45) Date of Patent: Aug. 2, 2016

(54) CONDUCTIVE POROUS LAYER FOR BATTERIES AND FABRICATION METHOD FOR SAME

(75) Inventors: Naoya Takeuchi, Tokyo (JP); Hiroshi Kishimoto, Tokyo (JP); Kasumi Oi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 222 days.

(21) Appl. No.: 14/007,423

(22) PCT Filed: Mar. 23, 2012

(86) PCT No.: PCT/JP2012/057646
§ 371 (c)(1),
(2), (4) Date: Dec. 9, 2013

(87) PCT Pub. No.: WO2012/133250
PCT Pub. Date: Oct. 4, 2012

(65) Prior Publication Data
US 2014/0087272 A1    Mar. 27, 2014

(30) Foreign Application Priority Data

Mar. 25, 2011    (JP) ................................. 2011-067654

(51) Int. Cl.
| H01M 8/22 | (2006.01) |
| H01M 4/36 | (2006.01) |
| B29C 47/00 | (2006.01) |
| H01M 4/86 | (2006.01) |
| H01M 8/02 | (2016.01) |
| H01M 8/10 | (2016.01) |
| H01M 12/06 | (2006.01) |
| H01M 4/88 | (2006.01) |
| H01M 12/02 | (2006.01) |

(52) U.S. Cl.
CPC .......... *H01M 4/8605* (2013.01); *H01M 4/8652* (2013.01); *H01M 4/8657* (2013.01); *H01M 4/8668* (2013.01); *H01M 4/8673* (2013.01); *H01M 4/8875* (2013.01); *H01M 8/0234* (2013.01); *H01M 8/0239* (2013.01); *H01M 8/0243* (2013.01); *H01M 8/0245* (2013.01); *H01M 8/1002* (2013.01); *H01M 12/02* (2013.01); *H01M 12/06* (2013.01); *Y02E 60/521* (2013.01); *Y02P 70/56* (2015.11)

(58) Field of Classification Search
CPC ............ H01M 4/8605; H01M 4/8657; H01M 4/8668; H01M 4/8673; H01M 8/0234; H01M 8/0245; H01M 8/0243; H01M 12/06; H01M 12/02; H01M 4/8875; H01M 4/8652; H01M 4/0239; H01M 4/1002; Y02E 60/521
USPC ................... 429/405, 403; 156/246
See application file for complete search history.

(56) References Cited

U.S. PATENT DOCUMENTS

| 4,505,992 | A | 3/1985 | Dettling et al. |
| 4,732,637 | A | 3/1988 | Dettling et al. |
| 6,103,413 | A * | 8/2000 | Hinton et al. ................. 429/468 |
| 2006/0046926 | A1 | 3/2006 | Ji et al. |
| 2009/0098440 | A1 * | 4/2009 | Hodgkinson et al. ........... 429/40 |
| 2010/0178585 | A1 | 7/2010 | Kuroda et al. |
| 2011/0244358 | A1 | 10/2011 | Yamauchi et al. |
| 2014/0087272 | A1 | 3/2014 | Takeuchi et al. |

FOREIGN PATENT DOCUMENTS

| EP | 2677579 A1 | 12/2013 |
| JP | 2002-313359 A | 10/2002 |
| JP | 2003-197202 A | 7/2003 |
| JP | 2005-310660 A | 11/2005 |
| JP | 2006-278037 A | 10/2006 |
| JP | 2006-324104 A | 11/2006 |
| JP | 2006-339018 A | 12/2006 |
| JP | 2008-052933 A | 3/2008 |
| JP | 2008-147145 A | 6/2008 |
| JP | 2009-021228 A | 1/2009 |
| JP | 2009-129650 A | 6/2009 |
| JP | 2009-295428 A | 12/2009 |
| JP | 2010-108646 A | 5/2010 |
| JP | 4930644 B1 | 5/2012 |
| WO | WO-99-60643 A1 | 11/1999 |
| WO | WO-2007088396 A1 | 8/2007 |
| WO | WO-2009131554 A1 | 10/2009 |
| WO | WO-2011/030489 A1 | 3/2011 |

OTHER PUBLICATIONS

Extended European Search Report dated Sep. 16, 2014 for EP Patent Application No. 12762744.6.
International Search Report dated Jun. 26, 2012, issued for PCT/JP2012/057646.
Notification of Reasons for Refusal, issued in corresponding Japanese Patent Application No. JP 2013-115267, dated Jun. 21, 2016.

* cited by examiner

*Primary Examiner* — William Cheung
(74) *Attorney, Agent, or Firm* — Locke Lord LLP; James E. Armstrong, IV; Nicholas J. DiCeglie, Jr.

(57) ABSTRACT

The conductive porous layer for batteries according to the present invention comprises a laminate comprising a first conductive layer and a second conductive layer. The first conductive layer includes at least a conductive carbon material and a polymer. The second conductive layer includes at least a conductive carbon material and a polymer. The conductive porous layer satisfies at least one of the following two conditions: "the polymer in the first conductive layer is present with a high density at the surface of the layer in contact with the second conductive layer than at the surface not in contact with the second conductive layer" and "the polymer in the second conductive layer is present with a higher density at the surface of the layer in contact with the first conductive layer than at the surface not in contact with the first conductive layer."

5 Claims, No Drawings

CONDUCTIVE POROUS LAYER FOR BATTERIES AND FABRICATION METHOD FOR SAME

This application is the National Stage of PCT International Application No. PCT/JP2012/057646 on Mar. 23, 2012, which claims the benefit under 35 U.S.C. Section 119(a) to Patent Application No. 2011-067654, filed in Japan on Mar. 25, 2011, all of which are hereby expressly incorporated by reference into the present application.

TECHNICAL FIELD

The present invention relates to a conductive porous layer for batteries, and a production method thereof. When used for fuel cells, the conductive porous layer for batteries of the present invention can be used as a gas diffusion layer.

BACKGROUND ART

Electrochemical cells such as fuel cells and metal-air batteries, which use gas in an electrode reaction, are provided with a conductive porous layer to improve the battery performance thereof.

For example, a membrane-electrode assembly (MEA) that is used as a component of a solid polymer fuel cell has a structure wherein a conductive porous layer, a catalyst layer, an ion-conductive solid polymer electrolyte membrane, a catalyst layer, and a conductive porous layer are sequentially laminated.

Generally, a conductive porous substrate, such as carbon paper or carbon cloth, is used for this conductive porous layer. Further, to improve the conductivity, gas diffusivity, water drainability, etc., of the conductive porous substrate, a conductive layer comprising conductive carbon particles, water-repellent resin, etc., may be formed on the conductive porous substrate.

Conventional conductive porous layers are formed by applying a conductive layer-forming paste composition to a conductive porous substrate having a surface roughness of about tens of μm, such as carbon paper or carbon cloth, and then drying (application methods; see Patent Literature (PTL) 1 and 2). Therefore, due to the penetration of the paste composition into the conductive porous substrate surface, etc., it was difficult to form a conductive layer with a uniform thickness. When the film thickness of the conductive layer is not uniform as described above, that is, when there is variation in the film thickness of the conductive layer, stable permeation and diffusion of gas over the adjacent catalyst layer surface is impossible, which lowers fuel cell performance. Another method for producing a conductive porous layer comprises forming a conductive layer on a transfer film by a transfer method, then pressure-welding the conductive layer onto the conductive porous substrate, and removing the transfer film. However, compared to the above application methods, this method is insufficient in terms of adhesion between the conductive porous substrate and the conductive layer. Thus, there is room for improvement in battery performance, etc. The above problem is not limited to solid polymer fuel cells, but is also common among metal-air batteries, and the like.

CITATION LIST

Patent Literature

PTL 1: JP2006-278037A
PTL 2: JP2006-339018A

SUMMARY OF INVENTION

Technical Problem

An object of the present invention is to provide a conductive porous layer that has good adhesion between the first conductive layer and second conductive layer, and that has reduced film thickness variation in each conductive layer.

Solution to Problem

In view of the above problems, the present inventors conducted extensive research to impart the desired properties to a conductive porous layer for batteries. As a result, the inventors found that a conductive porous layer for batteries that can solve the above problems can be provided by using a first conductive layer and a second conductive layer comprising specific components. The present invention was accomplished based on this finding. More specifically, a conductive porous layer that comprises a first conductive layer with a stable thickness formed on a second conductive layer and that has an improved adhesion between the first conductive layer and the second conductive layer can be provided by laminating the first conductive layer on the second conductive layer in such a manner as to satisfy at least one of the following conditions: (A) a polymer in the first conductive layer is present with a higher density at the surface of the layer in contact with the second conductive layer than at the surface not in contact with the second conductive layer, and
(B) a polymer in the second conductive layer is present with a higher density at the surface of the layer in contact with the first conductive layer than at the surface not in contact with the first conductive layer.

Thus, the present invention provides the following conductive porous layer for batteries, and production method thereof.

Item 1. A conductive porous layer for batteries comprising a laminate comprising a first conductive layer and a second conductive layer,
the first conductive layer comprising at least a conductive carbon material and a polymer, and
the second conductive layer comprising at least a conductive carbon material and a polymer, and
the conductive porous layer satisfying at least one of the following conditions:
(A) the polymer in the first conductive layer is present with a higher density at the surface of the layer in contact with the second conductive layer than at the surface not in contact with the second conductive layer, and
(B) the polymer in the second conductive layer is present with a higher density at the surface of the layer in contact with the first conductive layer than at the surface not in contact with the first conductive layer.
Item 2. The conductive porous layer for batteries according to Item 1, wherein the glass transition temperature of the polymer in the first conductive layer is −100 to 300° C.
Item 3. The conductive porous layer for batteries according to Item 1 or 2, wherein the glass transition temperature of the polymer in the second conductive layer is −100 to 300° C.
Item 4. The conductive porous layer for batteries according to any one of Items 1 to 3 that satisfies both of the above conditions (A) and (B).
Item 5. The conductive porous layer for batteries according to according to any one of items 1 to 4, wherein the conductive carbon material in the second conductive layer is conductive carbon fibers with an average fiber diameter of 5 µm or more and/or conductive carbon particles with an average particle diameter of 5 µm or more.

Item 6. The conductive porous layer for batteries according to any one of Items 1 to 5, which is a gas diffusion layer for fuel cells or a conductive porous layer for metal-air batteries.

Item 7. A method for producing the conductive porous layer for batteries according to any one of Items 1 to 6, the method comprising the steps of:

(I) applying a first conductive layer-forming paste composition to a substrate and drying, wherein the composition comprises at least a conductive carbon material and a polymer, and then detaching the resulting first conductive layer from the substrate to produce a first conductive layer having a polymer with a higher density at one side surface than at the opposite side surface, (II) applying a second conductive layer-forming paste composition to a substrate and drying, wherein the composition comprises a conductive carbon material and a polymer, and then detaching the resulting second conductive layer from the substrate to produce a second conductive layer having a polymer with a higher density at one side surface than at the opposite side surface, and (III) disposing the first conductive layer and the second conductive layer in such a manner as to satisfy at least one of the following conditions:

(A) the polymer in the first conductive layer is present with a higher density at the surface of the layer in contact with the second conductive layer than at the surface not in contact with the second conductive layer, and (B) the polymer in the second conductive layer is present with a higher density at the surface of the layer in contact with the first conductive layer than at the surface not in contact with the first conductive layer; and performing hot-pressing for bonding.

Item 8. The method according to Item 7, wherein the polymer in step (I) has a glass transition temperature of −100 to 300° C.

Item 9. The method according to Item 7 or 8, wherein the polymer in step (II) has a glass transition temperature of −100 to 300° C.

Item 10. The method according to any one of Items 7 to 9, wherein step (III) is a step of disposing the first conductive layer and the second conductive layer in such a manner as to satisfy both of the conditions (A) and (B), and performing hot-pressing for bonding.

Item 11. The method according to any one of Items 7 to 10, wherein the conductive carbon material in step (II) is conductive carbon fibers with an average fiber diameter of 5 µm or more and/or conductive carbon particles with an average particle diameter of 5 µm or more.

Item 12. A membrane-electrode assembly for batteries comprising:

a catalyst layer laminated membrane comprising a catalyst layer, an electrolyte membrane, and a catalyst layer that are sequentially laminated; and the conductive porous layer for batteries according to any one of Items 1 to 5 laminated on one or both sides of the catalyst layer laminated membrane in such a manner that the first conductive layer is in contact with the catalyst layer.

Item 13. A battery comprising the membrane-electrode assembly for batteries according to Item 12.

1. Conductive Porous Layer for Batteries

The conductive porous layer for batteries according to the present invention comprises a laminate comprising a first conductive layer and a second conductive layer. The first conductive layer comprises at least a conductive carbon material and a polymer. The second conductive layer comprises at least a conductive carbon material and a polymer. Both of the polymers in the first conductive layer and the second conductive layer preferably have a glass transition temperature (Tg) in the range of −100 to 300° C. There is no particular limitation on the type of battery for which the conductive porous layer of the present invention is used insofar as the battery uses a gas as an active material of a negative or positive electrode. Examples of batteries include fuel cells, metal-air batteries, and the like.

First Conductive Layer

The first conductive layer comprises at least a conductive carbon material and a polymer. The thickness of the first conductive layer is not particularly limited. The preferable thickness of the first conductive layer is typically about 1 to 150 µm, and particularly preferably about 5 to 100 µm. In the present invention, a gas diffusion layer with excellent gas diffusivity, gas permeability, water management properties, etc., can be provided by forming the first conductive layer.

Conductive Carbon Material

Examples of conductive carbon materials include, but are not limited to, conductive carbon particles, conductive carbon fibers, and the like.

Conductive Carbon Particles

Any carbon material that is conductive may be used as conductive carbon particles, and known or commercially available materials can be used. Examples of such carbon materials include carbon blacks such as channel black, furnace black, ketjen black, acetylene black, and lamp black; graphite; active charcoal; and the like. Such carbon materials can be used singly, or in a combination of two or more. The incorporation of such conductive carbon particles can enhance the conductivity of the conductive porous layer.

When a carbon black is used as conductive carbon particles, the average particle diameter (arithmetic average particle diameter) of the carbon black is not limited. The preferable average particle diameter thereof is typically about 5 to 200 nm, and particularly preferably about 5 to 100 nm. When a carbon black aggregate is used, the preferable average particle diameter thereof is about 10 to 600 nm, and particularly preferably about 50 to 500 nm. When graphite, active charcoal, or the like is used, the preferable average particle diameter thereof is about 500 nm to about 40 µm, and particularly preferably about 1 to 35 µm. The average particle diameter of the conductive carbon particles can be measured, for example, by an LA-920 particle size distribution analyzer, produced by Horiba, Ltd.

Conductive Carbon Fibers

Incorporation of conductive carbon fibers can improve the quality of the surface coated with the first conductive layer-forming paste composition, and can also provide a sheet-like first conductive layer with high strength. Examples of conductive carbon fibers that can be used in the first conductive layer include, but are not limited to, vapor-grown carbon fibers (VGCF (registered trademark)), carbon nanotubes, carbon nanocaps, carbon nanowalls, and the like. Such conductive carbon fibers may be used singly, or in a combination of two or more.

The fiber diameter of the conductive carbon fibers is not particularly limited. The preferable average fiber diameter thereof is about 50 to 450 nm, and particularly preferably about 100 to 250 nm. The use of such conductive carbon fibers can increase the nanometric fine pore volume, and is expected to provide effects such as flooding tolerance due to enhanced drainability and gas diffusion performance. The fiber length of the conductive carbon fibers is also not limited. The preferable average fiber length thereof is about 4 to 500 µm, particularly about 4 to 300 µm, more preferably about 4 to 50 µm, and particularly preferably about 10 to 20 µm. The preferable average aspect ratio thereof is about 5 to 600, and particularly preferably about 10 to 500. The fiber diameter, fiber length, and aspect ratio of the conductive carbon fibers can be measured from images measured under a scanning electron microscope (SEM), etc.

Polymer

The polymer is not particularly limited, and known or commercially available materials can be used. The polymer preferably has a glass transition temperature of about −100 to 300° C., more preferably −60 to 250° C., even more preferably about −30 to 220° C., and particularly preferably about −20 to 210° C. Specific examples of polymers include ion-conductive polymer resins (e.g., Nafion), vinyl acetate resins, styrene-acrylic copolymer resins, styrene-vinyl acetate copolymer resins, ethylene-vinyl acetate copolymer resins, polyester-acrylic copolymer resins, urethane resins, acrylic resins, phenolic resins, polyvinylidene fluoride (PVDF), and the like. Other examples thereof include hexafluoropropylene-vinylidene fluoride copolymers, trifluorochloroethylene-vinylidene fluoride copolymers, and like fluororubbers, silicone rubbers, and the like. Such polymers may be used singly, or in a combination of two or more.

The use of an elastomer such as fluororubber as a polymer can increase the flexibility of the first conductive layer, and also increase its adhesion to other layers due to a low Tg of the elastomer. In this specification, the term "fluororubber" refers to a material having a Tg of about −30 to 100° C. Thus, with the use of such a material, a multilayer conductive porous sheet can be easily produced.

As the elastomer, an elastomer emulsion (a suspension in which elastomer particles are dispersed) may be used, or an elastomer dissolved in a solvent may be used. In the case of using an elastomer emulsion, an emulsion prepared by dispersing an elastomer in a solvent, or a commercially available product can be used. Examples of the solvent include water, ethanol, propanol, and the like. When an elastomer dissolved in a solvent is used, examples of the solvent include N-methylpyrrolidone (NMP), methyl ethyl ketone (MEK), toluene, vinyl acetate, dimethylacetamide (DMA), isopropyl alcohol (IPA), and the like.

To impart water repellency to the first conductive layer, a water-repellent resin, such as a fluorine-based resin, may be used. In particular, when a polymer with poor water repellency is used as the polymer, the use of a water-repellent resin is effective for increasing water repellency. Examples of such fluorine-based resins include polytetrafluoroethylene resin (PTFE), fluorinated ethylene propylene resin (FEP), perfluoroalkoxy resin (PFA), and the like.

In the present invention, the first conductive layer-forming paste composition may comprise a dispersant, alcohol, etc., in addition to the above conductive carbon material and polymer, as long as the effect of the present invention is not impaired.

Dispersant

The dispersant may be any dispersant that can disperse a conductive carbon material and a polymer in water. Known or commercially available dispersants can be used. Examples of such dispersants include nonionic dispersants such as polyoxyethylene distyrenated phenyl ether, polyoxyethylene alkylene alkyl ether, and polyethylene glycol alkyl ether; cationic dispersants such as alkyltrimethylammonium salts, dialkyl dimethyl ammonium chlorides, and alkylpyridinium chlorides; and anionic dispersants such as polyoxyethylene fatty acid esters and acidic group-containing structure-modified polyacrylate. Such dispersants may be used alone, or in a combination of two or more.

Alcohol

The alcohol is not particularly limited, and known or commercially available alcohols can be used. Examples of such alcohols include monohydric or polyhydric alcohols having about 1 to 5 carbon atoms. Specific examples thereof include methanol, ethanol, 1-propanol, isopropanol, 1-butanol, 1-pentanol, and the like.

Second Conductive Layer

The second conductive layer comprises at least a conductive carbon material and a polymer. The thickness of the second conductive layer is not particularly limited. The preferable thickness thereof is typically about 30 to 300 µm, and particularly preferably about 50 to 250 µm. In the present invention, a conductive porous layer with excellent film strength, gas permeability, and gas diffusivity can be provided by forming the second conductive layer.

Conductive Carbon Material

Examples of conductive carbon materials include, but are not limited to, conductive carbon particles, conductive carbon fibers, and the like.

Conductive Carbon Fibers

Incorporation of conductive carbon fibers enables the production of a sheet-like second conductive layer with high strength. The conductive carbon fiber used in the second conductive layer is not particularly limited, and examples thereof include PAN (polyacrylonitrile)-based carbon fibers, pitch-based carbon fibers, and the like.

The fiber diameter of the conductive carbon fibers is not particularly limited. The preferable average fiber diameter thereof is about 5 to 20 µm, and particularly preferably about 6 to 15 µm. The use of such conductive carbon fibers can produce a high-strength film; and furthermore, the formation of fine pores having a micrometric diameter can provide high gas permeability. The fiber length of the conductive carbon fibers is not particularly limited. The preferable average fiber length thereof is 5 µm to 1 mm, and particularly preferably about 10 to 600 µm. The preferable average aspect ratio thereof is about 1 to 50, and particularly preferably about 2 to 40. The fiber diameter, fiber length, and aspect ratio of the conductive carbon fibers can be measured from images measured under a scanning electron microscope (SEM), etc.

Conductive Carbon Particles

A second conductive layer with high gas permeability and gas diffusivity can be produced by using conductive carbon particles. Examples of conductive carbon particles that can be used in the second conductive layer include graphite, active charcoal, and the like.

The particle diameter of conductive carbon particles is not particularly limited. The preferable average particle diameter thereof is preferably about 5 to 100 µm, and particularly preferably about 6 to 80 µm. The average particle diameter of the conductive carbon particles can be measured, for example, by an LA-920 particle size distribution analyzer produced by Horiba, Ltd.

The above conductive carbon materials may be used singly, or as a mixture of two or more. When two or more types of conductive carbon materials are used, both conductive carbon fibers and conductive carbon particles can be used.

Polymer

The polymer may be the same material as that used in the first conductive layer. Specifically, the polymer preferably has a Tg of about −100 to 300° C., more preferably about −60 to 250° C., even more preferably about −30 to 220° C., and particularly preferably about −20 to 210° C. Specific examples of such polymers include ion-conductive polymer resins (e.g., Nafion), vinyl acetate resins, styrene-acrylic copolymer resins, styrene-vinyl acetate copolymer resins, ethylene-vinyl acetate copolymer resins, polyester-acrylic copolymer resins, urethane resins, acrylic resins, phenolic resins, polyvinylidene fluoride (PVDF), and the like. Other examples thereof include fluororubbers such as hexafluoropropylene-vinylidene fluoride copolymers and trifluorochloroethylene-vinylidene fluoride copolymers, silicone rubbers, and the like. Such polymers may be used singly, or in a combination of two or more.

In the present invention, the second conductive layer-forming paste composition may comprise a fluorine-based resin, a dispersant, alcohol, etc., in addition to the above conductive carbon material and polymer, as long as the effect of the present invention is not impaired. Usable fluorine-based resins, dispersants, and alcohols may be the same materials as used in the first conductive layer.

Characteristics of the First Conductive Layer and the Second Conductive Layer

In the present invention, the front and back sides of each of the first conductive layer and the second conductive layer have different densities of the polymer component. That is, the first conductive layer or the second conductive layer has a polymer with a higher density at one side surface than at the opposite side surface. In the present invention, when the first or second conductive layer comprises two or more types of polymers, at least one type of polymer is preferably present with a higher density at one side surface of the layer than at the opposite side surface. The distribution state of the polymer component in the first conductive layer and the second conductive layer can be confirmed, for example, by analyzing both surfaces using energy-dispersive X-ray fluorescence spectrometry, etc. The distribution of the polymer component can also be analyzed by energy-dispersive X-ray fluorescence analysis in the layer's cross-sectional direction. When the element specific to the polymer cannot be detected by energy-dispersive X-ray fluorescence analysis, for example, in the case of using a styrene-acrylic acid rubber, the functional group resulting from the polymer can be observed by a Fourier transform infrared spectrophotometer, etc.

In the present invention, the pore diameter distribution of the first conductive layer is preferably such that the volume of pores having a diameter of 10 nm to 5 µm, and preferably 20 nm to 5 µm, accounts for at least 50% of the total pore volume. The pore diameter distribution can be measured, for example, by an AutoPore IV 9500 automatic porosimeter (produced by Shimadzu Corporation). The above-mentioned pore diameter distribution can be achieved by using, for example, conductive carbon fibers with an average fiber diameter of about 50 to 450 nm, a polymer, conductive carbon particles with an average particle diameter (arithmetic average particle diameter) of 5 to 200 nm, or conductive carbon particles (e.g., graphite, active charcoal, etc.) with an average particle diameter of 500 nm to 40 µm.

The pore diameter distribution of the second conductive layer is preferably such that the volume of pores having a diameter of 5 to 100 µm, and preferably 5 to 50 µm, accounts for at least 50% of the total pore volume. The above pore diameter distribution can be achieved, for example, by using conductive carbon fibers with an average fiber diameter of about 5 µm or more, using a polymer, etc.

Method for Producing the First Conductive Layer and the Second Conductive Layer

In the present invention, the first conductive layer can be obtained, for example, by applying the first conductive layer-forming paste composition to a substrate, and drying the composition; and then detaching the substrate. The second conductive layer can also be obtained by applying the second conductive layer-forming paste composition to a substrate, and drying the composition; and then detaching the substrate.

When the first conductive layer and the second conductive layer are formed by the above method, the proportion of the polymer component that is present at the surfaces of the first conductive layer and the second conductive layer can be adjusted by utilizing the phenomenon, occurring during the drying of the paste composition, in which the polymer component contained in the first conductive layer-forming paste composition or in the second conductive layer-forming paste composition segregates from the side not in contact with the substrate toward the side in contact with the substrate. Accordingly, the density of the polymer component at one side surface of the layer can be increased by adjusting the amount of polymer used, viscosity of the paste composition, particle diameter in the case of using an elastomer emulsion as a polymer, drying time, specific gravity of the carbon material (e.g., conductive carbon particles, conductive carbon fibers, etc.), functional group present at the surface of the carbon material (e.g., conductive carbon particles, conductive carbon fibers, etc.), and the like. In particular, as the viscosity of the paste composition lowers and the drying time lengthens, the resin tends to segregate (see Table 1).

Content

The first conductive layer-forming paste composition may comprise, for example, about 30 to 200 parts by weight (particularly 40 to 150 parts by weight) of a polymer, about 0 to 100 parts by weight (particularly 5 to 50 parts by weight) of a dispersant, and about 0 to 1,100 parts by weight (particularly 100 to 1,000 parts by weight) of a solvent, such as alcohol, based on 100 parts by weight of conductive carbon particles (the total amount of conductive carbon particles and conductive carbon fibers, when conductive carbon fibers are contained). When conductive carbon particles and conductive carbon fibers are both contained, the ratio of conductive carbon particles to conductive carbon fibers is preferably in the range of about 9:1 (weight ratio) to about 1:9 (weight ratio), and is particularly preferably about 8:2 (weight ratio) to about 2:8 (weight ratio). To enhance water repellency, the composition may contain a fluorine-based resin in an amount of about 5 to 250 parts by weight (particularly 10 to 200 parts by weight). When an elastomer emulsion is used as a polymer, the solids content is preferably within the above-mentioned range. When the first conductive layer-forming paste composition contains a resin component having a Tg outside the range of −100 to 300° C., the ratio of the polymer having a Tg within the range of −100 to 300° C. to the resin component having a Tg outside the range of −100 to 300° C. is preferably in the range of about 9.5:0.5 (weight ratio) to about 4:6 (weight ratio), and is particularly preferably about 9:1 (weight ratio) to about 5:5 (weight ratio).

The second conductive layer-forming paste composition may comprise, for example, about 5 to 150 parts by weight (particularly 10 to 100 parts by weight) of a polymer, 0 to 100 parts by weight (particularly 5 to 50 parts by weight) of a dispersant, and 0 to 500 parts by weight (particularly about 10 to 400 parts by weight) of a solvent, such as alcohol, based on 100 parts by weight of the conductive carbon material. When conductive carbon particles and conductive carbon fibers are both contained, the ratio of conductive carbon particles to conductive carbon fibers is preferably in the range of about 9:1 (weight ratio) to about 1:9 (weight ratio), and is particularly preferably about 8:2 (weight ratio) to about 2:8 (weight ratio). When an elastomer emulsion is used as a polymer, the solids content is preferably within the above-mentioned range. When the second conductive layer-forming paste composition comprises a resin component having a Tg outside the range of −100 to 300° C., the ratio of the polymer having a Tg within the range of −100 to 300° C. to the resin component having a Tg outside the range of −100 to 300° C. is preferably in the range of about 9:1 (weight ratio) to 4:6 (weight ratio), and is particularly preferably about 8:2 (weight ratio) to 5:5 (weight ratio).

The first conductive layer-forming paste composition and the second conductive layer-forming paste composition comprise the aforementioned components.

The substrate is not particularly limited insofar as the paste composition can be applied thereto. Known or commercially available substrates can be used widely. Examples of such substrates include polyimide, polyethylene terephthalate, polyparabanic acid, aramid, polyamide (nylon), polysulfone, polyether sulphone, polyphenylene sulfide, polyether ether ketone, polyether imide, polyarylate, polyethylene naphthalate, polypropylene, and like polymeric films. Further, ethylene-tetrafluoroethylene copolymer (ETFE), tetrafluoroethylene-hexafluoropropylene copolymer (FEP), tetrafluoroethylene-perfluoroalkyl vinyl ether copolymer (PFA), polytetrafluoroethylene (PTFE), or the like can also be used. Among these, polymeric films that are highly heat-resistant and easily available are preferable. For example, polyethylene terephthalate, polyethylene naphthalate, polytetrafluoroethylene (PTFE), polyimide, and like films are preferable.

The substrate preferably has a release layer formed thereon. For example, the release layer may comprise a known wax. As a substrate having a release layer formed thereon, a film coated with SiOx, a fluororesin, or the like may be used.

It is preferable from the viewpoint of ease of handling and cost efficiency that the thickness of the substrate is typically about 6 to 100 μm, and particularly preferably about 10 to 60 μm.

The coating method is preferably application using known or commercially available doctor blades and like blades; wire bars; squeegees, and like instruments; applicators; die coaters; etc.

The amount of each paste composition to be applied is not particularly limited. The composition for forming a first conductive layer is preferably applied in such an amount that the resulting first conductive layer has a thickness of about 1 to 150 μm, and more preferably about 5 to 100 μm. The composition for forming a second conductive layer is preferably applied in such an amount that the resulting second conductive layer has a thickness of about 30 to 300 μm, and preferably about 50 to 250 μm.

The drying conditions are also not limited. The dry conditions can be suitably changed according to the conditions, such as the volatilization temperature of the solvent used (e.g., alcohol) (for example, about 150° C.), and the glass transition temperature of the polymer.

After the first conductive layer and the second conductive layer are obtained by drying, the layers may be further subjected to drying at a higher temperature (e.g., about 150 to 500° C.), if necessary.

Further, the first conductive layer and the second conductive layer may be treated on the surface (in particular, on the surface in contact with the other layer). Examples of the surface treatment include mechanical treatment to physically roughen the surface by a metallic brush, sandblasting, or the like, matting treatment, corona discharge treatment, plasma discharge treatment, ultraviolet treatment, etc.

Characteristics of the Conductive Porous Layer for Batteries

In the present invention, the conductive porous layer for batteries comprises a laminate comprising the aforementioned first conductive layer and second conductive layer. The first conductive layer and the second conductive layer are laminated in such a manner as to satisfy at least one of (preferably both of) the following conditions:

(A) a polymer in the first conductive layer is present with a higher density at the surface of the layer in contact with the second conductive layer than at the surface not in contact with the second conductive layer; and (B) a polymer in the second conductive layer is present with a higher density at the surface of the layer in contact with the first conductive layer than at the surface not in contact with the first conductive layer.

Specifically, the first conductive layer and the second conductive layer are laminated in such a manner as to satisfy at least one of the following conditions (preferably satisfy condition (b)):

(a) a polymer in the first conductive layer is present with a higher density at the surface of the layer not in contact with the second conductive layer than at the surface of the layer in contact with the second conductive layer, and a polymer in the second conductive layer is present with a higher density at the surface of the layer in contact with the first conductive layer than at the surface not in contact with the first conductive layer;

(b) a polymer in the first conductive layer is present with a higher density at the surface of the layer in contact with the second conductive layer than at the surface not in contact with the second conductive layer, and a polymer in the second conductive layer is present with a higher density at the surface of the layer in contact with the first conductive layer than at the surface not in contact with the first conductive layer; and (c) a polymer in the first conductive layer is present with a higher density at the surface of the layer in contact with the second conductive layer than at the surface not in contact with the second conductive layer, and a polymer in the second conductive layer is present with a higher density at the surface of the layer not in contact with the first conductive layer than at the surface in contact with the first conductive layer.

Thus, in the present invention, one or both of the surfaces at which a polymer (at least one type of polymer, when the first conductive layer contains a plurality of polymers) in the first conductive layer is present with a higher density, and the surface at which a polymer in the second conductive layer (at least one type of polymer when the second conductive layer contains a plurality of polymers) is present with a higher density are located at the interface between the first conductive layer and the second conductive layer. This can enhance the adhesion between the first conductive layer and the second conductive layer. Further, in the present invention, the first conductive layer is formed by applying the first conductive layer-forming paste composition to a substrate and drying, and then detaching the resulting layer from the substrate, after which the first conductive layer and the second conductive layer are laminated. This can reduce film thickness variation, compared to the method of applying the composition to conventionally used carbon paper or the like and drying.

Conductive Porous Substrate

The conductive porous layer of the present invention may comprise a known or commercially available gas diffusion layer (e.g., carbon paper, carbon cloth, carbon felt, etc.) as a conductive porous substrate formed on the second conductive layer.

For exemplary purposes with respect to the properties of typical carbon paper, the properties of TGP-H-060 produced by Toray Industries are shown below:
thickness: 190 µm;
electrical resistance: 80 mΩ-cm in the thickness direction, 5.8 mΩ-cm in the surface direction;
porosity: 78%;
bulk density: 0.44 g/cm$^3$;
surface roughness: 8 µm.

The thickness of the carbon paper, etc., is not limited. Preferably, the thickness is typically about 50 to 1,000 µm, and more preferably about 100 to 400 µm.

A conductive porous substrate previously subjected to a water-repellent treatment is preferably used. This can further enhance the water repellency of the conductive porous material.

The water-repellent treatment may be, for example, a method comprising immersing the conductive porous substrate in an aqueous dispersion of a fluorine-based resin, etc. The fluorine-based resin may be the aforementioned resin, or the like. In this method, a dispersant as mentioned above may be used to disperse a fluorine-based resin in water, and an aqueous suspension containing a fluorine-based resin and an aqueous dispersant is preferably used as the aqueous dispersion.

The amount of the fluorine-based resin in the aqueous dispersion is not particularly limited and may be, for example, about 1 to 30 parts by weight, and particularly preferably about 2 to 20 parts by weight, per 100 parts by weight of water.

Method for Producing a Conductive Porous Layer

The conductive porous layer of the present invention can be produced by laminating a first conductive layer, a second conductive layer, and optionally one or more other layers, and performing hot-pressing. The produced conductive porous layer for batteries of the present invention may be laminated on one side or both sides of the catalyst layer laminated membrane or of the electrolyte membrane described below, and bonded to produce a membrane-electrode assembly. Alternatively, the first conductive layer and the second conductive layer may be laminated in this order on one or both sides of the catalyst layer laminated membrane or of the electrolyte described below to produce the conductive porous layer for batteries and membrane-electrode assembly of the present invention at the same time.

More specifically, first, the first conductive layer is formed by the following step.

(I) After a first conductive layer-forming paste composition comprising at least conductive carbon particles and a polymer (preferably a polymer having a glass transition temperature of −30 to 220° C.) is applied to a substrate and dried, the resulting first conductive layer is detached from the substrate to produce a first conductive layer having a polymer with a higher density at one side surface than at the opposite side surface.

Subsequently, the second conductive layer is formed by the following step.

(II) After a second conductive layer-forming paste composition comprising at least conductive carbon particles and a polymer (preferably a polymer having a glass transition temperature of −30 to 220° C.) is applied to a substrate and dried, the resulting second conductive layer is detached from the substrate to produce a second conductive layer having a polymer with a higher density at one side surface than at the opposite side surface.

The conditions for producing the first conductive layer and the second conductive layer are as described above.

Further, the following step is performed to produce the conductive porous layer for batteries of the present invention.

(III) The first conductive layer and the second conductive layer are disposed in such a manner as to satisfy at least one of the following conditions:

(A) a polymer in the first conductive layer is present with a higher density at the surface of the layer in contact with the second conductive layer than at the surface not in contact with the second conductive layer, and (B) a polymer in the second conductive layer is present with a higher density at the surface of the layer in contact with the first conductive layer than at the surface not in contact with the first conductive layer; and performing hot-pressing for bonding.

In the above step (III), the hot-pressing temperature is not particularly limited. It is preferable that the hot-pressing temperature is not lower than the Tg of the polymers contained in the first conductive layer and in the second conductive layer. When the Tg of the polymer contained in the first conductive layer and the Tg of the polymer contained in the second conductive layer are different, the hot-pressing temperature is preferably not lower than the lower Tg. When the first conductive layer or the second conductive layer comprises a polymer having a Tg outside the range of −100 to 300° C., the hot-pressing temperature is preferably not lower than the lowest Tg among the Tg values of the polymers contained in the first conductive layer and the second conductive layer.

After the conductive porous layer comprising a laminate comprising the first conductive layer and the second conductive layer is produced in this manner, the layer may be further dried at a higher temperature (e.g., about 150 to 500° C.), if necessary.

2. Membrane-Electrode Assembly for Batteries

The conductive porous layer for batteries of the present invention can also be used to produce a membrane-electrode assembly for batteries. More specifically, the conductive porous layer of the present invention is preferably stacked on one side or both sides of the catalyst layer laminated membrane comprising a catalyst layer, an electrolyte membrane, and a catalyst layer that are sequentially laminated. In this case, the conductive porous layer of the present invention functions as a gas diffusion layer. Taking a membrane-electrode assembly for solid polymer fuel cells as an example, the constituent materials and the method for producing the catalyst layer laminated membrane are explained below.

Electrolyte Membrane

The electrolyte membrane may be any ion-conductive electrolyte membrane. Known or commercially available electrolyte membranes, such as hydrogen ion-conductive electrolyte membranes and hydroxide ion-conductive electrolyte membranes, can be used. Examples of hydrogen ion-conductive electrolyte membranes include "Nafion" (registered trademark) membrane produced by Du Pont, Inc., "Flemion" (registered trademark) membrane by Asahi Glass Co., Ltd., "Aciplex" (registered trademark) membrane by Asahi Kasei Corporation, "GoreSelect" (registered trademark) membrane by Gore & Assoc. Inc., and the like. Examples of hydroxide ion-conductive electrolyte membranes includes hydrocarbon-based electrolyte membranes such as Aciplex (registered trademark) A-201, A-211, A-221, etc., produced by Asahi Kasei Corporation, Neosepta (registered trademark) AM-1 and AHA by Tokuyama Corporation, and the like; and fluororesin electrolyte membranes such as Tosflex (registered trademark) IE-SF34 by Tosoh Corporation, Fumapem (registered trademark) FAA by FuMA-Tech GmbH, and the like.

It is preferable that the thickness of the electrolyte membrane is typically about 20 to 250 μm, and particularly preferably about 20 to 150 μm.

Catalyst Layer

As the catalyst layer, a known or commercially available platinum-containing catalyst layer (a cathode catalyst or an anode catalyst) can be used. Specifically, the catalyst layer is preferably formed of a dried product of the paste composition for forming a catalyst layer comprising (1) carbon particles supporting catalyst particles and (2) an ion-conductive polymer electrolyte (preferably a hydrogen ion-conductive polymer electrolyte).

Any catalyst particles that can cause an oxidation-reduction reaction (oxidation of hydrogen at the anode, and reduction of oxygen at the cathode) and that have catalytic activity can be used as the catalyst particles. Examples of catalyst particles include platinum, platinum alloys, platinum compounds, and the like. Examples of platinum alloys include alloys of platinum and at least one metal selected from the group consisting of ruthenium, palladium, nickel, molybdenum, iridium, iron, and cobalt.

Examples of ion-conductive polymer electrolytes include perfluorosulfonic acid-based fluorine ion-exchange resins. Specific examples thereof include perfluorocarbon sulfonic acid-based polymers (PFS polymers) in which a C—H bond of a hydrocarbon-based ion-exchange membrane is replaced with a fluorine.

The thickness of the catalyst layer is not particularly limited. The preferable thickness thereof is typically about 1 to 100 μm, and more preferably about 2 to 50 μm.

In the catalyst layer, fluororesins and non-polymer fluorine materials, such as fluorinated pitch, fluorinated carbon, and graphite fluoride, can be added as a water repellent.

Method for Producing the Catalyst Layer Laminated Membrane

The catalyst layer laminated membrane can be produced, for example, by disposing a catalyst layer transfer film in such a manner that the catalyst layer and the electrolyte membrane are face-to-face, pressing the layers under heating to transfer the catalyst layer to the electrolyte membrane, and then detaching the transfer film. A catalyst layer laminated membrane comprising a catalyst layer on both sides of the electrolyte membrane can be produced by repeating this operation twice. In consideration of work efficiency, etc., simultaneously laminating the catalyst layer on both sides of the electrolyte membrane is preferable.

For the transfer, it is preferable to press the layers from the substrate film side of the catalyst layer transfer film using a known pressing machine, etc. To avoid poor transfer, the pressure level is typically about 0.5 to 10 MPa, and particularly preferably about 1 to 8 MPa. To avoid poor transfer, the face to be pressed is preferably heated during the pressing operation. Preferably, the heating temperature is appropriately changed according to the type of electrolyte membrane to be used.

The substrate film is not particularly limited, and the same substrates as mentioned above can be used. Examples of substrate films include polymeric films such as polyimide, polyethylene terephthalate (PET), polysulfone, polyether sulphone, polyphenylene sulfide, polyether ether ketone, polyether imide, polyarylate, polyethylene naphthalate (PEN), polyethylene, polypropylene, and polyolefin. Heat-resistant fluororesins such as ethylene-tetrafluoroethylene copolymer (ETFE), tetrafluoroethylene-hexafluoropropylene copolymer (FEP), tetrafluoroethylene-perfluoroalkyl vinyl ether copolymer (PFA), and polytetrafluoroethylene (PTFE) can also be used. Among these, inexpensive and easily available polymeric films are preferable, and polyethylene terephthalate, etc., are more preferable.

In view of workability, cost efficiency, etc., of forming the catalyst layer on the substrate film, it is preferable that the thickness of the substrate film is typically about 6 to 150 μm, and particularly about 12 to 75 μm.

The substrate film may have a release layer formed thereon. Examples of release layers include a layer comprising a known wax, a plastic film coated with a known SiOx or a fluorine-based resin, and the like. A substrate film comprising a film with high release properties formed thereon, such as a laminate of a PET substrate and a heat-resistant fluororesin substrate; and like structured substrate films, are also usable.

3. Battery

The battery of the present invention (e.g., solid polymer fuel cells, metal-air batteries, etc.) can be produced by providing a known or commercially available separator, terminals, etc., in the above membrane-electrode assembly or conductive porous layer.

When the conductive porous layer of the present invention is used for metal-air batteries, the use is not particularly limited, and can be used, for example, in the following manner. The conductive porous layer of the present invention is stacked on one side of a positive electrode catalyst layer to form a positive electrode; and a negative electrode is disposed on the opposite side of the positive electrode catalyst layer via a separator. The space between the separator and the negative electrode catalyst layer (or between the negative electrode catalyst layer and the positive electrode catalyst layer) is filled with an electrode. In this case, the conductive porous layer of the present invention functions as a gas diffusion layer. Because the conductive porous layer of the present invention comprises a carbon material, it can be used without providing the aforementioned positive electrode catalyst layer. In this case, the conductive porous layer-forming layer functions as a catalyst layer and/or a gas diffusion layer.

The types of metal-air battery include lithium-air batteries, sodium-air batteries, potassium-air batteries, magnesium-air batteries, calcium-air batteries, zinc-air batteries, aluminum-air batteries, and iron-air batteries. The metal-air battery may be a primary battery or a secondary battery. The materials used to form the positive electrode catalyst layer, negative electrode, electrolyte, separator, and substrate may be known or commercially available materials that are conventionally used in metal-air batteries. The electrolyte may be in the form of a liquid, a gel, or a solid.

Advantageous Effects of Invention

According to the present invention, a conductive porous layer for batteries that has a good adhesion between the first conductive layer and the second conductive layer and that has reduced film thickness variation in each conductive layer can be provided.

DESCRIPTION OF EMBODIMENTS

The present invention is explained in detail with reference to Examples and Comparative Examples. The present invention is not limited to the following embodiments.

Materials

The materials shown below were used for preparation of the first conductive layer-forming paste composition and the second conductive layer-forming paste composition.

Conductive carbon particles (1): Furnace black (Balkan xc72R: produced by Cabot Corporation), average molecular weight: 1000 to 3000, average particle diameter: 30 nm Conductive carbon particles (2): CGB-35 (produced by Nippon Graphite Industries, Ltd.; average particle diameter: 35 µm)
Conductive carbon particles (3): Asahi HS-500 (produced by Asahi Carbon Co., Ltd.; average particle diameter: 38 nm)
Polymer (1): Nafion (a 5 wt % Nafion solution "DE-520" produced by Du Pont, Inc., was used), Tg: 130° C.
Polymer (2): AP-2675 (produced by Showa Denko K.K.; emulsion using a styrene acrylic acid-based copolymer resin; solids content 50 wt %), Tg: 0° C.
Polymer (3): TLX-1068-1 (produced by Showa Denko K.K.; emulsion using a styrene acrylic acid-based copolymer resin; solids content: 20 wt %), average particle diameter of 15 to 35 nm, Tg: 0° C.
Polymer (4): G-801 (produced by Daikin Industries, Ltd.; fluorine-containing rubber), Tg: 0° C.
Polymer (5): Solef 21216/1001 (produced by Solvay Solexis Inc.; PVDF), Tg: −30° C.
Polymer (6): Vinyrol PSA AV6020 (produced by Showa Denko K.K.; acrylic adhesive), Tg: −60° C.
Polymer (7): Solef 5130 (produced by Solvay Solexis Inc.; PVDF), Tg: −40° C.
Polymer (8): Shonol BRL-120Z (produced by Showa Denko K.K.; phenol resin; solids content: 70 wt %), Tg: 250° C.
Polymer (9): Polytetrafluoroethylene (PTFE) (AD911L produced by Asahi Glass Co., Ltd.; Tg: about 130° C.
Polymer (10): Polytetrafluoroethylene (PTFE) (Rubron L5 produced by Daikin Industries Ltd.; Tg: about 130° C.)
Conductive carbon fibers (1): VGCF (VGCF (registered trademark) (standard product): produced by Showa Denko K.K.; average fiber diameter: 150 nm, average fiber length: 10 to 20 µm, and average aspect ratio: 10 to 500)
Conductive carbon fibers (2): DONACARBO-Milled S-2404 (produced by Osaka Gas Chemical; average fiber diameter: 13 µm, average fiber length: 40 µm, and average aspect ratio: 3)
Conductive carbon fibers (3): Raheama R-A201 (produced by Teij in Ltd.; average fiber diameter: 8 µm, average fiber length: 50 µm, and average aspect ratio: 6)
Conductive carbon fibers (4): S241 (produced by Osaka Gas Chemical Co., Ltd.; average fiber diameter: 13 µm, average fiber length: 130 µm, and average aspect ratio: 10)
Dispersant: Emulgen A-60 (produced by Kao Corporation)

Examples 1 to 15 and Comparative Examples 1 to 7

In the following examples and comparative examples, both the first conductive layer and the second conductive layer have a size of 50×50 mm².

Example 1

(i) First Conductive Layer
Conductive carbon particles (1) (100 parts by weight), Polymer (9) (50 parts by weight), conductive carbon fibers (1) (75 parts by weight), polymer (1) (1250 parts by weight (solids content: 62.5 parts by weight)), the dispersant (25 parts by weight), and water (350 parts by weight) were subjected to media dispersion to prepare a first conductive layer-forming paste composition. The first conductive layer-forming paste composition was applied on a polyethylene terephthalate (PET) film, on which a release layer had been formed, to a thickness of about 50 µm using an applicator. Regarding the viscosity of the paste composition, the shear viscosity was about 150 mPa·s at a shear rate of 1000 (1/s). The viscosity of the paste composition was measured using a Physica MCR301 produced by Anton Paar GmbH (a cone-shaped jig with a diameter of 50 mm and an angle of 1° was used as a jig). The paste compositions used in other Examples and Comparative Examples were measured in the same manner. Subsequently, drying was performed in a drying furnace set at 95° C. for about 15 minutes to produce a first conductive layer.

(ii) Second Conductive Layer
Conductive carbon fibers (2) (100 parts by weight), polymer (2) (50 parts by weight (solids content: 25 parts by weight)), the dispersant (25 parts by weight), polymer (1) (60 parts by weight (solids content: 3 parts by weight)), and water (100 parts by weight) were subjected to media dispersion to prepare a second conductive layer-forming paste composition. The second conductive layer-forming paste composition was applied on a PET film, on which a release layer had been formed, to a thickness of about 150 µm using an applicator. Regarding the viscosity of the paste composition, the shear viscosity was about 70 mPa·s at a shear rate of 1000 (1/s). Subsequently, drying was performed in a drying furnace set at 95° C. for about 40 minutes to produce a second conductive layer.

(iii) Conductive Porous Layer
The first conductive layer and the second conductive layer were each individually detached from the PET film including the release layer, and the surface of the first conductive layer having the polymers (polymers (1) and (9)) with a higher density was disposed adjacent to the surface of the second conductive layer having the polymers (polymers (1) and (2)) with a higher density. Hot-pressing was then performed at a pressing temperature of 100° C. and a pressing pressure of 7.5 kN, for a pressing time of 2 minutes to produce the conductive porous layer of Example 1.

Example 2

Using the same material compositions of Example 1, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 µm (the first conductive layer) and a thickness of about 150 µm (the second conductive layer) using an applicator. The first conductive layer and the second conductive layer were each individually detached from the PET film including the release layer, and the surface of the first conductive layer having the polymers (polymers (1) and (9)) with a lower density was disposed adjacent to the surface of the second conductive layer having the polymers (polymers (1) and (2)) with a higher density. Hot-pressing was then performed at a pressing temperature of 100° C. and a pressing pressure of 7.5 kN, for a pressing time of 2 minutes to produce the conductive porous layer of Example 2.

Example 3

Using the same material compositions of Example 1, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 µm (the first conductive layer) and a thickness of about 150 µm (the second conductive layer) using an applicator. The first conductive layer and the second conductive layer were each individually detached from the PET film including the release layer, and the surface of the first conductive layer having the polymers (polymers (1) and (9)) with a higher density was disposed adjacent to the surface of the second conductive layer having the polymers (polymers (1) and (2)) with a lower density. Hot-pressing was then performed at a pressing temperature of 100° C. and a pressing pressure of 7.5 kN, for a pressing time of 2 minutes to produce the conductive porous layer of Example 3.

Example 4

(i) First Conductive Layer

Conductive carbon particles (1) (100 parts by weight), conductive carbon fibers (1) (100 parts by weight), polymer (3) (1600 parts by weight (solids content: 320 parts by weight)), polymer (1) (1600 parts by weight (solids content: 80 parts by weight)), and ethanol (250 parts by weight) were subjected to media dispersion to prepare a first conductive layer-forming paste composition. The first conductive layer-forming paste composition was applied on a PET film, on which a release layer had been formed, to a thickness of about 50 μm using an applicator. Regarding the viscosity of the paste composition, the shear viscosity was about 170 mPa·s at a shear rate of 1000 (1/s). Subsequently, drying was performed in a drying furnace set at 95° C. for about 15 minutes to produce a first conductive layer.

(ii) Second Conductive Layer

Conductive carbon fibers (2) (100 parts by weight), polymer (2) (50 parts by weight (solids content: 25 parts by weight)), the dispersant (25 parts by weight), polymer (1) (60 parts by weight (solids content: 3 parts by weight)), and water (100 parts by weight) were subjected to media dispersion to prepare a second conductive layer-forming paste composition. The second conductive layer-forming paste composition was applied on a PET film, on which a release layer had been formed, to a thickness of about 150 μm using an applicator. Regarding the viscosity of the paste composition, the shear viscosity was about 70 mPa·s at a shear rate of 1000 (1/s). Subsequently, drying was performed in a drying furnace set at 95° C. for about 40 minutes to produce a second conductive layer.

(iii) Conductive Porous Layer

The first conductive layer and the second conductive layer were each individually detached from the PET film including the release layer, and the surface of the first conductive layer having the polymers (polymers (1) and (3)) with a higher density was disposed adjacent to the surface of the second conductive layer having the polymers (polymers (1) and (2)) with a higher density. Hot-pressing was then performed at a pressing temperature of 100° C. and a pressing pressure of 7.5 kN, for a pressing time of 2 minutes to produce the conductive porous layer of Example 4.

Example 5

Using the same material compositions of Example 4, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (1) and (3)) with a lower density was disposed adjacent to the surface of the second conductive layer having the polymers (polymers (1) and (2)) with a higher density. Hot-pressing was then performed at a pressing temperature of 100° C. and a pressing pressure of 7.5 kN, for a pressing time of 2 minutes to produce the conductive porous layer of Example 5.

Example 6

Using the same material compositions of Example 4, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (1) and (3)) with a higher density was disposed adjacent to the surface of the second conductive layer having the polymers (polymers (1) and (2)) with a lower density. Hot-pressing was then performed at a pressing temperature of 100° C. and a pressing pressure of 7.5 kN, for a pressing time of 2 minutes to produce the conductive porous layer of Example 6.

Example 7

(i) First Conductive Layer

Polymer (4) was added to methyl ethyl ketone (MEK), and the mixture was maintained using a stirrer (media rotation speed: 300 rpm) at 80° C. for 60 minutes, thereby obtaining a fluorine-containing rubber solution having a solids content (polymer (4)) of 20 wt % in which polymer (4) was dissolved in the MEK. Subsequently, conductive carbon fibers (1) (100 parts by weight), conductive carbon particles (2) (85 parts by weight), the prepared fluorine-containing rubber solution having a solids content of 20 wt % (920 parts by weight (solids content: 184 parts by weight)), and MEK (1670 parts by weight) were subjected to media dispersion to prepare a first conductive layer-forming paste composition. The first conductive layer-forming paste composition was applied on a PET film (Serapiru manufactured by Toray Industries Inc.), on which a release layer had been formed, to a thickness of about 50 μm using an applicator. Regarding the viscosity of the paste composition, the shear viscosity was about 150 mPa·s at a shear rate of 1000 (1/s). Subsequently, drying was performed in a drying furnace set at 95° C. for about 15 minutes to produce a first conductive layer.

(ii) Second Conductive Layer

Polymer (5) was added to MEK and the mixture was maintained using a stirrer (media rotation speed: 300 rpm) at 80° C. for 60 minutes, thereby obtaining a PVDF solution having a solids content (polymer (5)) of 10 wt % in which polymer (5) was dissolved in the MEK. Subsequently, conductive carbon fibers (3) (100 parts by weight), the prepared PVDF solution (100 parts by weight (solids content: 10 parts by weight)), and MEK (50 parts by weight) were subjected to media dispersion to prepare a second conductive layer-forming paste composition. The second conductive layer-forming paste composition was applied on a PET film (Serapiru manufactured by Toray Industries Inc.), on which a release layer had been formed, to a thickness of about 150 µm using an applicator. Regarding the viscosity of the paste composition, the shear viscosity was about 350 mPa·s at a shear rate of 1000 (1/s). Subsequently, drying was performed in a drying furnace set at 95° C. for about 40 minutes to produce a second conductive layer.

(iii) Conductive Porous Layer

The first conductive layer and the second conductive layer were each individually detached from the PET film including the release layer, and the surface of the first conductive layer having the polymer (polymer (4)) with a higher density was disposed adjacent to the surface of the second conductive layer having the polymer (polymer (5)) with a higher density. Hot-pressing was then performed at a pressing temperature of 100° C. and a pressing pressure of 7.5 kN, for a pressing time of 2 minutes to produce the conductive porous layer of Example 7.

Example 8

Using the same material compositions of Example 7, the first conductive layer-forming paste composition and the second conductive layer-forming paste composition were prepared. The first conductive layer-forming paste composition and the second conductive layer-forming paste composition were each individually applied on a PET film (Serapiru manufactured by Toray Industries, Inc.), on which a release layer had been formed, to a thickness of about 50 µm (the first conductive layer) and a thickness of about 150 µm (the second conductive layer) using an applicator. The first conductive layer and the second conductive layer were each individually detached from the PET film including the release layer, and the surface of the first conductive layer having the polymer (polymer (4)) with a higher density was disposed adjacent to the surface of the second conductive layer having the polymer (polymer (5)) with a lower density. Hot-pressing was then performed at a pressing temperature of 100° C. and a pressing pressure of 7.5 kN, for a pressing time of 2 minutes to produce the conductive porous layer of Example 8.

Example 9

Using the same material compositions of Example 7, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 µm (the first conductive layer) and a thickness of about 150 µm (the second conductive layer) using an applicator. The first conductive layer and the second conductive layer were each individually detached from the PET film including the release layer, and the surface of the first conductive layer having the polymer (polymer (4)) with a lower density was disposed adjacent to the surface of the second conductive layer having the polymer (polymer (5)) with a higher density. Hot-pressing was then performed at a pressing temperature of 100° C. and a pressing pressure of 7.5 kN, for a pressing time of 2 minutes to produce the conductive porous layer of Example 9.

Example 10

(i) First Conductive Layer

Conductive carbon particles (1) (100 parts by weight), polymer (9) (50 parts by weight), conductive carbon fibers (1) (75 parts by weight), polymer (1) (1250 parts by weight), the dispersant (25 parts by weight), and water (1050 parts by weight) were subjected to media dispersion to prepare a first conductive layer-forming paste composition. The first conductive layer-forming paste composition was applied on a PET film, on which a release layer had been formed, to a thickness of about 50 µm using an applicator. Regarding the viscosity of the paste composition, the shear viscosity was about 60 mPa·s at a shear rate of 1000 (1/s). Subsequently, drying was performed in a drying furnace set at 95° C. for about 30 minutes to produce a first conductive layer.

(ii) Second Conductive Layer

Conductive carbon fibers (2) (100 parts by weight), polymer (2) (50 parts by weight (solids content: 25 parts by weight)), the dispersant (25 parts by weight), polymer (1) (60 parts by weight (solids content: 3 parts by weight)), and water (100 parts by weight) were subjected to media dispersion to prepare a second conductive layer-forming paste composition. The second conductive layer-forming paste composition was applied on a PET film, on which a release layer had been formed, to a thickness of about 150 µm using an applicator. Regarding the viscosity of the paste composition, the shear viscosity was about 70 mPa·s at a shear rate of 1000 (1/s). Subsequently, drying was performed in a drying furnace set at 95° C. for about 30 minutes to produce a second conductive layer.

(iii) Conductive Porous Layer

The first conductive layer and the second conductive layer were each individually detached from the PET film including the release layer, and the surface of the first conductive layer having the polymers (polymers (1) and (9)) with a higher density was disposed adjacent to the surface of the second conductive layer having the polymers (polymers (1) and (2)) with a higher density. Hot-pressing was then performed at a pressing temperature of 100° C. and a pressing pressure of 7.5 kN, for a pressing time of 2 minutes to produce the conductive porous layer of Example 10.

Example 11

(i) First Conductive Layer

Polymer (5) was added to methyl ethyl ketone (MEK), and the mixture was maintained using a stirrer (media rotation speed: 300 rpm) at 80° C. for 60 minutes, thereby obtaining a PVDF solution having a solids content (polymer (5)) of 10 wt % in which polymer (5) was dissolved in the MEK. Subsequently, conductive carbon particles (3) (100 parts by weight), the prepared PVDF solution having a solids content of 10 wt % (1000 parts by weight (solids content: 100 parts by weight)), and MEK (1125 parts by weight) were subjected to media dispersion to prepare a first conductive layer-forming paste composition. The first conductive layer-forming paste composition was applied on a PET film (Serapiru manufactured by Toray Industries Inc.), on which a release layer had been formed, to a thickness of about 50 µm using an applicator. Regarding the viscosity of the paste composition, the shear viscosity was about 150 mPa·s at a shear rate of 1000 (1/s). Subsequently, drying was performed in a drying furnace set at 95° C. for about 15 minutes to produce a first conductive layer.

(ii) Second Conductive Layer

Polymer (5) was added to MEK, and the mixture was maintained using a stirrer (media rotation speed: 300 rpm) at 80° C. for 60 minutes, thereby obtaining a PVDF solution having a solids content (polymer (5)) of 10 wt % in which polymer (5) was dissolved in the MEK. Subsequently, conductive carbon particles (2) (100 parts by weight), the prepared PVDF solution (100 parts by weight (solids content: 10 parts by weight)), and MEK (50 parts by weight) were subjected to media dispersion to prepare a second conductive layer-forming paste composition. The second conductive layer-forming paste composition was applied on a PET film (Serapiru manufactured by Toray Industries Inc.), on which a release layer had been formed, to a thickness of about 150 μm using an applicator. Regarding the viscosity of the paste composition, the shear viscosity was about 200 mPa·s at a shear rate of 1000 (1/s). Subsequently, drying was performed in a drying furnace set at 95° C. for about 40 minutes to produce a second conductive layer.

(iii) Conductive Porous Layer

The first conductive layer and the second conductive layer were each individually detached from the PET film including the release layer, and the surface of the first conductive layer having the polymer (polymer (5)) with a higher density was disposed adjacent to the surface of the second conductive layer having the polymer (polymer (5)) with a higher density. Hot-pressing was then performed at a pressing temperature of 135° C. and a pressing pressure of 7.5 kN, for a pressing time of 2 minutes to produce the conductive porous layer of Example 11.

Example 12

(i) First Conductive Layer

Conductive carbon particles (1) (100 parts by weight), polymer (10) (50 parts by weight), polymer (6) (167 parts by weight), conductive carbon fibers (1) (76.7 parts by weight), and isopropanol (150 parts by weight) were subjected to media dispersion to prepare a first conductive layer-forming paste composition. The first conductive layer-forming paste composition was applied on a polyethylene terephthalate (PET) film, on which a release layer had been formed, to a thickness of about 50 μm using an applicator. Regarding the viscosity of the paste composition, the shear viscosity was about 92 mPa·s at a shear rate of 1000 (1/s). Subsequently, drying was performed in a drying furnace set at 95° C. for about 15 minutes to produce a first conductive layer.

(ii) Second Conductive Layer

Conductive carbon fibers (4) (100 parts by weight), polymer (5) (100 parts by weight (solids content: 10 parts by weight)), and methyl ethyl ketone (50 parts by weight) were subjected to media dispersion to prepare a second conductive layer-forming paste composition. The second conductive layer-forming paste composition was applied on a PET film, on which a release layer had been formed, to a thickness of about 150 μm using an applicator. Regarding the viscosity of the paste composition, the shear viscosity was about 437 mPa·s at a shear rate of 1000 (1/s). Subsequently, drying was performed in a drying furnace set at 95° C. for about 40 minutes to produce a second conductive layer.

(iii) Conductive Porous Layer

The first conductive layer and the second conductive layer were each individually detached from the PET film including the release layer, and the surface of the first conductive layer having the polymers (polymers (6) and (10)) with a higher density was disposed adjacent to the surface of the second conductive layer having the polymer (polymer (5)) with a higher density. Hot-pressing was then performed at a pressing temperature of 80° C. and a pressing pressure of 5.0 kN, for a pressing time of 1 minute to produce the conductive porous layer of Example 12.

Example 13

Using the same material compositions of Example 12, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (6) and (10)) with a lower density was disposed adjacent to the surface of the second conductive layer having the polymer (polymer (5)) with a higher density. Hot-pressing was then performed at a pressing temperature of 90° C. and a pressing pressure of 10.0 kN, for a pressing time of 1 minute to produce the conductive porous layer of Example 13.

Example 14

(i) First Conductive Layer

Using the same material compositions of Example 12, the first conductive layer-forming paste composition was prepared. The first conductive layer-forming paste composition was applied on a PET film, on which a release layer had been formed, to a thickness of about 50 μm using an applicator.

(ii) Second Conductive Layer

Polymer (7) was added to MEK, and the mixture was maintained using a stirrer (media rotation speed: 300 rpm) at 80° C. for 60 minutes, thereby obtaining a PVDF solution having a solids content (polymer (7)) of 5 wt % in which polymer (7) was dissolved in the MEK. Conductive carbon fibers (4) (100 parts by weight), the prepared PVDF solution (200 parts by weight (solids content: 10 parts by weight)), and methyl ethyl ketone (50 parts by weight) were subjected to media dispersion to prepare a second conductive layer-forming paste composition. The second conductive layer-forming paste composition was applied on a PET film, on which a release layer had been formed, to a thickness of about 150 μm using an applicator. Regarding the viscosity of the paste composition, the shear viscosity was about 366 mPa·s at a shear rate of 1000 (1/s). Subsequently, drying was performed in a drying furnace set at 95° C. for about 40 minutes to produce a second conductive layer.

(iii) Conductive Porous Layer

The first conductive layer and the second conductive layer were each individually detached from the PET film including the release layer, and the surface of the first conductive layer having the polymers (polymers (6) and (10)) with a higher density was disposed adjacent to the surface of the second conductive layer having the polymer (polymer (7)) with a higher density. Hot-pressing was then performed at a pressing temperature of 90° C. and a pressing pressure of 10.0 kN, for a pressing time of 1 minute to produce the conductive porous layer of Example 14.

Example 15

(i) First Conductive Layer

Polymer (5) was added to MEK, and the mixture was maintained using a stirrer (media rotation speed: 300 rpm) at 80° C. for 60 minutes, thereby obtaining a PVDF solution having a solids content (polymer (5)) of 10 wt % in which polymer (5) was dissolved in the MEK. Subsequently, conductive carbon particles (1) (100 parts by weight), polymer (10) (50 parts by weight), the prepared PVDF solution (500 parts by weight (solids content: 50 parts by weight)), polymer (8) (100 parts by weight (solids content: 70 parts by weight)), and methyl ethyl ketone (1000 parts by weight) were subjected to media dispersion to prepare a first conductive layer-forming paste composition. The first conductive layer-forming paste composition was applied on a polyethyleneterephthalate (PET) film, on which a release layer had been formed, to a thickness of about 50 μm using an applicator. Regarding the viscosity of the paste composition, the shear viscosity was about 166 mPa·s at a shear rate of 1000 (1/s). Subsequently, drying was performed in a drying furnace set at 95° C. for about 15 minutes to produce a first conductive layer.

(ii) Second Conductive Layer

Conductive carbon fibers (4) (100 parts by weight), the PVDF solution prepared in the same manner as in the first conductive layer above (100 parts by weight (solids content: 10 parts by weight)), polymer (8) (20 parts by weight (solids content: 14 parts by weight)), and methyl ethyl ketone (200 parts by weight) were subjected to media dispersion to prepare a second conductive layer-forming paste composition. The second conductive layer-forming paste composition was applied on a PET film, on which a release layer had been formed, to a thickness of about 150 μm using an applicator. Regarding the viscosity of the paste composition, the shear viscosity was about 264 mPa·s at a shear rate of 1000 (1/s). Subsequently, drying was performed in a drying furnace set at 95° C. for about 40 minutes to produce a second conductive layer.

(iii) Conductive Porous Layer

The first conductive layer and the second conductive layer were each individually detached from the PET film including the release layer, and the surface of the first conductive layer having the polymers (polymers (5), (8), and (10)) with a higher density was disposed adjacent to the surface of the second conductive layer having the polymers (polymers (5) and (8)) with a higher density. Hot-pressing was then performed at a pressing temperature of 135° C. and a pressing pressure of 7.5 kN, for a pressing time of 2 minutes to produce the conductive porous layer of Example 15.

Comparative Example 1

Using the same material compositions of Example 1, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (1) and (9)) with a lower density was disposed adjacent to the surface of the second conductive layer having the polymers (polymers (1) and (2)) with a lower density. Hot-pressing was then performed at a pressing temperature of 100° C. and a pressing pressure of 7.5 kN, for a pressing time of 2 minutes to produce the conductive porous layer of Comparative Example 1.

Comparative Example 2

Using the same material compositions of Example 4, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (1) and (3)) with a lower density was disposed adjacent to the surface of the second conductive layer having the polymers (polymers (1) and (2)) with a lower density. Hot-pressing was then performed at a pressing temperature of 100° C. and a pressing pressure of 7.5 kN, for a pressing time of 2 minutes to produce the conductive porous layer of Comparative Example 2.

Comparative Example 3

Using the same material compositions of Example 7, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymer (polymer (4)) with a lower density was disposed adjacent to the surface of the second conductive layer having the polymer (polymer (5)) with a lower density. Hot-pressing was then performed at a pressing temperature of 100° C. and a pressing pressure of 7.5 kN, for a pressing time of 2 minutes to produce the conductive porous layer of Comparative Example 3.

Comparative Example 4

Using the same material compositions of Example 11, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymer (polymer (5)) with a lower density was disposed adjacent to the surface of the second conductive layer having the polymer (polymer (5)) with a lower density. Hot-pressing was then performed at a pressing temperature of 135° C. and a pressing pressure of 7.5 kN, for a pressing time of 2 minutes to produce the conductive porous layer of Comparative Example 4.

Comparative Example 5

Using the same material compositions of Example 12, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (6) and (10)) with a lower density was disposed adjacent to the surface of the second conductive layer having the polymer (polymer (5)) with a lower density. Hot-pressing was then performed at a pressing temperature of 90° C. and a pressing pressure of 10.0 kN, for a pressing time of 1 minute to produce the conductive porous layer of Comparative Example 5.

Comparative Example 6

Using the same material compositions of Example 14, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (6) and (10)) with a lower density was disposed adjacent to the surface of the second conductive layer having the polymer (polymer (7)) with a lower density. Hot-pressing was then performed at a pressing temperature of 90° C. and a pressing pressure of 10.0 kN, for a pressing time of 1 minute to produce the conductive porous layer of Comparative Example 6.

Comparative Example 7

Using the same material compositions of Example 15, the first conductive layer-forming paste composition and the second conductive layer-forming paste composition were prepared. The first conductive layer-forming paste composition and the second conductive layer-forming paste composition were each individually applied on a PET film, on which a release layer had been formed, to a thickness of about 50 μm (the first conductive layer) and a thickness of about 150 μm (the second conductive layer) using an applicator. The first conductive layer and the second conductive layer were each individually detached from the PET film including the release layer, and the surface of the first conductive layer having the polymers (polymers (5), (8), and (10)) with a lower density was disposed adjacent to the surface of the second conductive layer having the polymers (polymers (5) and (8)) with a lower density. Hot-pressing was then performed at a pressing temperature of 135° C. and a pressing pressure of 7.5 kN, for a pressing time of 2 minutes to produce the conductive porous layer of Comparative Example 7.

First Conductive Layer Evaluation Test

As typical examples, Table 1 shows the results of the front and back surfaces of the first conductive layers of Examples 1 and 10, which were observed by energy dispersion X-ray fluorescence analysis. An EX-23000 BU energy dispersion X-ray fluorescence analysis device produced by JEOL Ltd. was used as an analysis device. The results confirmed that the proportion of each of the F and S elements contained in Nafion resin and PTFE resin was different between the front surface and the back surface of the first conductive layer; and both the PTFE resin and Nafion resin segregated between the front surface and the back surface of the first conductive layer. Compared to the results of Example 1, the results of Example 10 showed a significant difference. Accordingly, it was confirmed that resin was more likely to segregate when the first conductive layer-forming paste composition had a low viscosity. Similar results were obtained in Examples 2 to 9 and 11 to 15. In Table 1, "PET film contact surface" means a surface that is in contact with the PET film before the PET film is detached from the first conductive layer, and "PET film non-contact surface" is a surface opposite to the PET film contact surface.

TABLE 1

| Evaluation element | Example 1 | | Example 10 | |
| --- | --- | --- | --- | --- |
| | PET film non-contact surface | PET film contact surface | PET film non-contact surface | PET film contact surface |
| C | 61.32 | 58.85 | 62.53 | 57.72 |
| N | 18.81 | 16.36 | 18.89 | 15.98 |
| O | 2.8 | 3.23 | 2.52 | 3.41 |
| F | 16.68 | 20.85 | 15.71 | 21.97 |
| S | 0.39 | 0.71 | 0.35 | 0.92 |

Second Conductive Layer Evaluation Test

As a typical example, Table 2 shows the results of the front and back surfaces of the second conductive layer of Example 14, which were observed by energy dispersion X-ray fluorescence analysis, as in the first conductive layer evaluation test described above. An EX-23000 BU energy dispersion X-ray fluorescence analysis device produced by JEOL Ltd. was used as an analysis device. The results confirmed that the proportion of F elements in PVDF was different between the front surface and the back surface of the second conductive layer; and PVDF segregated between the front surface and the back surface of the second conductive layer. In the second conductive layer of Example 14, the polymer significantly segregated compared to the first conductive layers of Examples 1 and 10, even though the viscosity was extremely high. This is presumably because the size of the carbon material used in the second conductive layer in Example 14 was larger than that of the first conductive layers in Examples 1 and 10, thus resulting in a large porous diameter, and the second conductive layer in Example 14 had a greater thickness than that of the first conductive layers in Examples 1 and 10. Similar results were obtained in Examples 1 to 13 and 15. In Table 2, "PET film contact surface" means a surface that is in contact with the PET film before the PET film is detached from the first conductive layer, and "PET film non-contact surface" is a surface opposite to the PET film contact surface.

TABLE 2

| Evaluation element | Example 14 | |
| --- | --- | --- |
| | PET film non-contact surface | PET film contact surface |
| C | 69.66 | 66.67 |
| N | 28.45 | 22.49 |
| O | 1.14 | 0.42 |
| F | 0.68 | 10.39 |
| S | 0.07 | 0.09 |

Conductive Porous Layer Evaluation Test

Using a medium-temperature press device (produced by Tester Sangyo Co., Ltd.), adhesion between the first conductive layer and the second conductive layer in each of the conductive porous layers of Examples 1 to 15 and Comparative Examples 1 to 7 was measured.

Adhesion was subjectively evaluated as to whether the layers were adhered together in a manner such that one layer was not detached from another layer. Specifically, adhesion was rated A or B.
A: Strongly adhered and difficult to detach layers with hands.
B: Easy to detach layers with hands, or no adhesion was observed. Table 3 shows the results.

TABLE 3

| | Adhesion between the first conductive layer and the second conductive layer |
|---|---|
| Example 1 | A |
| Example 2 | A |
| Example 3 | A |
| Example 4 | A |
| Example 5 | A |
| Example 6 | A |
| Example 7 | A |
| Example 8 | A |
| Example 9 | A |
| Example 10 | A |
| Example 11 | A |
| Example 12 | A |
| Example 13 | A |
| Example 14 | A |
| Example 15 | A |
| Comp. Exam. 1 | B |
| Comp. Exam. 2 | B |
| Comp. Exam. 3 | B |
| Comp. Exam. 4 | B |
| Comp. Exam. 5 | B |
| Comp. Exam. 6 | B |
| Comp. Exam. 7 | B |

To attain high adhesion between the first conductive layer and the second conductive layer, Examples 1 to 15 confirmed that at least one of the following conditions must be satisfied: (A) the polymer in the first conductive layer was present with a high density at the surface in contact with the second conductive layer, and (B) the polymer in the second conductive layer was present with a high density at the surface in contact with the first conductive layer.

The results confirmed that, by layering the first conductive layer and the second conductive layer in a manner such that at least one of the following conditions was satisfied: (A) the polymer in the first conductive layer was present with a high density at the surface in contact with the second conductive layer, and (B) the polymer in the second conductive layer was present with a high density at the surface in contact with the first conductive layer, the conductive porous layer in which the first conductive layer having a uniform film thickness was formed on the second conductive layer can be produced.

The invention claimed is:

1. A method for producing the conductive porous layer for batteries comprising a laminate comprising a first conductive layer and a second conductive layer, the first conductive layer comprising at least a conductive carbon material and a polymer, and the second conductive layer comprising at least a conductive carbon material and a polymer, and the conductive porous layer satisfying at least one of the following conditions:
   (A) the polymer in the first conductive layer is present with a higher density at the surface of the layer in contact with the second conductive layer than at the surface not in contact with the second conductive layer, and
   (B) the polymer in the second conductive layer is present with a higher density at the surface of the layer in contact with the first conductive layer than at the surface not in contact with the first conductive layer, the method comprising the steps of:
   (I) applying a first conductive layer-forming paste composition to a substrate and drying, wherein the composition comprises at least a conductive carbon material and a polymer, and then detaching the resulting first conductive layer from the substrate to produce a first conductive layer having a polymer with a higher density at one side surface than at the opposite side surface,
   (II) applying a second conductive layer-forming paste composition to a substrate and drying, wherein the composition comprises at least a conductive carbon material and a polymer, and then detaching the resulting second conductive layer from the substrate to produce a second conductive layer having a polymer with a higher density at one side surface than at the opposite side surface, and
   (III) disposing the first conductive layer and the second conductive layer in such a manner as to satisfy at least one of the following conditions:
      (A) the polymer in the first conductive layer is present with a higher density at the surface of the layer in contact with the second conductive layer than at the surface not in contact with the second conductive layer, and
      (B) the polymer in the second conductive layer is present with a higher density at the surface of the layer in contact with the first conductive layer than at the surface not in contact with the first conductive layer; and performing hot-pressing for bonding.

2. The method according to claim 1, wherein the polymer in step (I) has a glass transition temperature of −100 to 300° C.

3. The method according to claim 1, wherein the polymer in step (II) has a glass transition temperature of −100 to 300° C.

4. The method according to claim 1, wherein step (III) is a step of disposing the first conductive layer and the second conductive layer in such a manner as to satisfy both of the conditions (A) and (B), and performing hot-pressing for bonding.

5. The method according to claim 1, wherein the conductive carbon material in step (II) is conductive carbon fibers with an average fiber diameter of 5 μm or more and/or conductive carbon particles with an average particle diameter of 5 μm or more.

* * * * *